United States Patent [19]

Hinkle

[11] 4,272,905
[45] Jun. 16, 1981

[54] GIG WITH REMOVABLE TINES

[76] Inventor: Ernest G. Hinkle, 12431 SW. First Pl., Plantation, Fla. 33325

[21] Appl. No.: 969,283

[22] Filed: Dec. 13, 1978

[51] Int. Cl.³ ............................................. A01K 81/04
[52] U.S. Cl. .......................................................... 43/6
[58] Field of Search ................. 43/5, 6; 294/61, 99 R; 76/111; 403/353, 373

[56] References Cited

U.S. PATENT DOCUMENTS

| | | | |
|---|---|---|---|
| 1,227,035 | 5/1917 | Boudreau | 294/99 R |
| 1,276,017 | 8/1918 | Beymer | 403/373 X |
| 1,519,113 | 12/1924 | Burkhart | 43/6 |
| 1,546,334 | 7/1925 | Amundson | 294/61 X |
| 2,794,668 | 6/1957 | Christensen | 43/6 X |
| 3,955,302 | 5/1976 | Tudisco | 43/6 |

FOREIGN PATENT DOCUMENTS 211406 10/1955 Australia ........................................ 43/6
227066 5/1943 Switzerland ................................. 294/61

Primary Examiner—Nicholas P. Godici
Attorney, Agent, or Firm—Malin & Haley

[57] ABSTRACT

A gig for hunting frogs and fish having a tubular body, with a rear end portion attachable to an elongated handle. The tubular body has tines fastened to it. One end of each tine is inserted in holes positioned around the body to make contact with the inside surface of the tubular body while a rotatable clincher ring is placed forward of the rear end portion and the holes to secure the tines against the outside surface of the body. The clincher ring has a gap in it which allows the removal and replacement of a defective tine, by rotating the clincher ring until the gap is above the tine to be removed.

3 Claims, 5 Drawing Figures

U.S. Patent  Jun. 16, 1981  4,272,905
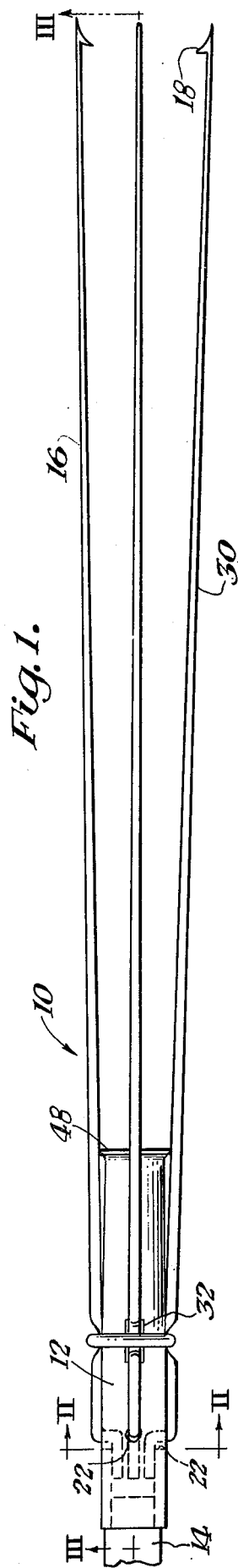
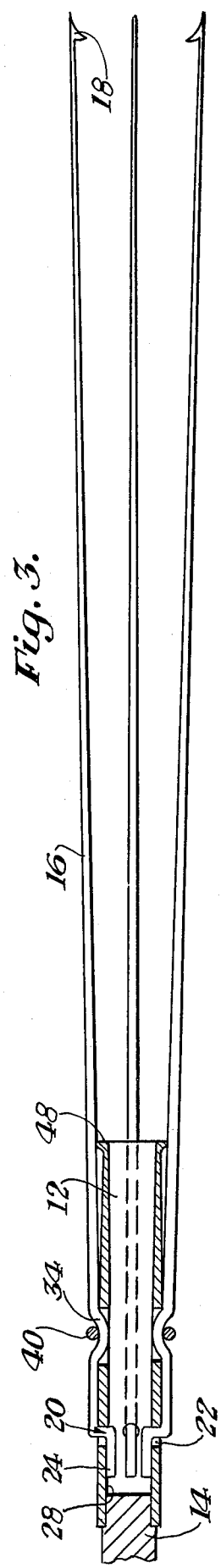
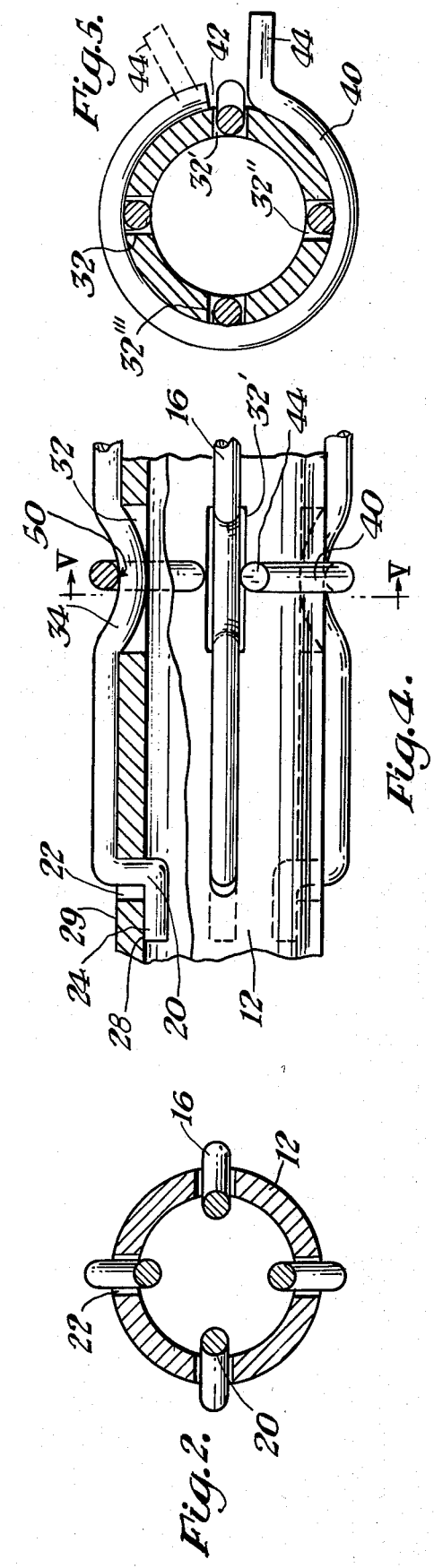

GIG WITH REMOVABLE TINES

BACKGROUND OF THE INVENTION

This invention relates to a new and improved frog and fish gig, and more particularly to a gig with tines which can easily be removed without the use of tools.

Gigs having replaceable tines, such as shown in U.S. Pat. No. 2,794,668 to Christensen, are well known. Usually in these gigs, the tines are secured to the gig by screws, rivets, or brazing, thus making it difficult to disassemble the gig in the field.

An additional disadvantage of the prior gigs is that they are costly to produce due to the machining or welding required in manufacture.

SUMMARY OF THE INVENTION

The present invention relates to a new and improved gig for spearing frogs and fish, which affords a solution to the problems mentioned above. The present invention provides a non-complex gig with easily removable and replaceable tines.

The present gig has a tubular body with an outside surface and an inside surface to which tines are fastened by use of opening in the body and by means of a clincher ring. The body has a plurality of holes circumscribed about the body between the rear end portion and the forward end portion. A plurality of elongated holes are likewise circumscribed about the body forward of said holes. The clincher ring is a biasing means or spring that has a gap in it which allows a tine to pass therethrough. The clincher ring is moveably circumscribed about the body. The tines are placed between the body and the clincher ring. One end or proximal end of each tine is bent in a direction in a step-like manner providing a step portion which allows insertion of the proximal end into a hole in the body. The step portion engages the inside surface of said body while the shank of the tine passes through the gap in the clincher ring. At a forward distance along the shank of the tine where the clincher ring is placed, the shank is again bent in the same direction inward to form a concave protuberance. An elongated hole in the body is so positioned that the concave portion of the shank fits into the elongated hole so that the tine lies along the outside of the body. The clincher ring is then rotated by means of a thumb tab until the clincher ring body is above the tine and the gap in the clincher ring is above another elongated hole, whereupon another tine may be removed or replaced as described above. When the gap in the clincher ring is rotated to a position away from the elongated holes, the tines are all held securely to the body and the gig is ready for use.

It is therefore an object of the present invention to provide a frog or fish gig with easily removable tines for dismantling of the gig.

It is another object of the present invention to provide a frog or fish gig that has tines that may be quickly removed and replaced without the use of tools.

It is yet another object of the present invention to provide a non-complex frog or fish gig that can be produced and repaired inexpensively.

A further object of this invention is to provide a frog or fish gig that may be used to clamp the gig to a pole while clamping the tines to the body.

In accordance with these and other objects which will be apparent hereinafter, the instant invention will now be described with particular reference to the accompanying drawings.

BRIEF DESCRIPTION OF THE DRAWINGS

FIG. 1 is a plan view of the present invention in an assemblied position.

FIG. 2 is a sectional view of FIG. 1 taken along lines II—II.

FIG. 3 is a sectional elevation view of the present invention taken along lines III—III in FIG. 2.

FIG. 4 is an exploded view, partially broken away, of the central portion of the body of the present invention.

FIG. 5 is a sectional view of FIG. 4 taken along lines V—V.

DESCRIPTION OF THE PREFERRED EMBODIMENT

Considering now the present invention in some detail and referring to the drawings, it is noted that in FIGS. 1 and 3 there is illustrated an embodiment of the present invention consisting of a frog and fish gig 10 having a generally tubular body 12 removably attachable to a handle 14. The tubular body 12 has a plurality of spear means or tines 16 disposed along its outer longitudinal surface. The preferred embodiment illustrates four tines. The tines 16 have a shank portion 30 with barbs 18 at the distal end portion, while the proximal end portion is curved in an inward, step-like shape 20 which helps maintain the tines in an attachable relation to the body 12 through apertures or holes 22. The apertures or holes 22 are spaced around the body 12 and are larger in diameter than the tines 16 or the proximal end portion 20. These oversized diameter apertures 22 allow the proximal end portion of the tines 16 to be inserted therein such that the lower step 24 is in a parallel position to the shank 30, but is disposed near the inside surface 28 of the body 12.

FIG. 2 illustrates a body having four tines 16 with their proximal end portions 20 disposed through apertures 22. The body 12 may be used with only one tine or a plurality of tines.

The body 12 also has a plurality of elongated slots or elongated holes 32 therethrough, disposed along a longitudinal line parallel to the projection of the tines 16. The tines have a concave portion 34 projecting inward as the step portion 20. The elongated slots 32 are forward of the holes 22 and are designed to receive the concave portion 34 of the shank, so that the tines generally protrude near the outer surface 29 of the body 12.

As illustrated in FIGS. 4 and 5, a biasing clincher ring 40 having a gap 42 therein is circumferentially disposed about the body 12 above the elongated slots 32, 32', 32", and 32'''. The ring 40 is biased to maintain the tines 16 in a removable relationship to the body 12 or any other position as shown by the phantom view of the tab 44 in FIG. 5. The ring 40 may be easily rotated about the body 12 by the tab 44. The upper surface 50 of the concave portion of the tines in FIG. 4 may be slightly above the projected outside surface 29 of the body 12. This allows the biasing ring to maintain a biasing force on the tine.

In actual operation, a damaged tine may be removed or replaced, or all the tines may be removed for safety reasons while transporting the gig, in a very few seconds. By rotating the clincher ring 40 until the gap 42 is directly above an elongated slot 32, 32', 32", or 32''', a tine 16 may be removed by lifting the concave portion 34 of the tine from the elongated slot and then removing the step-like end 20 of the tine from the aperture 22. The reversal of this procedure will permit the insertion of a tine in the gig. Thereafter, when the gap 42 in the clincher ring 40 is rotated to a position away from the elongated slot 32 as illustrated in phantom in FIG. 5, the tine is held securely to the body 12.

A generally acute angle with the horizontal centerline of the gig is maintained for the tines 16 by an outwardly projecting wall 48 near the front portion of the body 12. The shank portion 30 of the tine may be bent inwardly or outwardly to change the angle of the tines extending beyond the projecting wall 48. The tines may be bent to provide four barbs in a line in a circle as shown or in an enlarged circle.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A gig for catching animals, comprising:
   an elongated body having a longitudinal center line, a forward end and a rear end;
   said body including a first body aperture in said body and a second body means spaced from said first body aperture along a line parallel to the longitudinal center line of said body;
   a spear means connected in one fixed workable position to said body and positioned on the surface of said body generally parallel to the longitudinal center line of said body;
   said spear means including a barbed first end positioned beyond said forward end of said body, a second end means for insertion through said first body aperture, and a second means positioned between said barbed first end and said second end means, said secured means for positioning said spear means; and
   a quick release biasing securing means disposed about said spear means and said surface of said body adjacent said second body means for removably securing said spear means to said body in a fixed position, said quick release biasing securing means for quick movement from a secured position to a spear released position by finger or thumb movement;
   said movable means includes a gap for removing and replacing said spear means from said body whereby said gig may be easily assembled and disassembled for safe storage and shipment when not in use.

2. A gig removably attachable to a handle means for catching frogs and fish, comprising:
   an elongated body having a longitudinal axis;
   said body including a first aperture in said body and a second body means spaced from said first aperture along a line parallel to the longitudinal axis of said body;
   a spear means generally disposed on the outer surface of said body and generally parallel to the longitudinal axis of said body;
   said spear means including a barbed first and extending beyond a distal end of said body, a second end means for insertion through said first aperture, and a secured portion positioned between said barbed first end and said second end means for positioning in relation to said second body means; and
   a biasing means circumferentially disposed around the outer surface of said body above said second means for removably securing said spear means to said body,
   said biasing means has a gap therein for moving said spear means therethrough when said gap is positioned above said second body means.

3. A gig removably attachable to a handle means for catching frogs and fish, comprising:
   an elongated body having a longitudinal axis;
   said body including a first aperture in said body and a second body means spaced from said first aperture along a line parallel to the longitudinal axis of said body;
   a spear means generally disposed on the outer surface of said body and generally parallel to the longitudinal axis of said body;
   said spear means including a barbed first and extending beyond a distal end of said body, a second end means for insertion through said first aperture, and a secured portion positioned between said barbed first end and said second end means for positioning in relation to said second body means; and
   a biasing means circumferentially disposed around the outer surface of said body above said second means for removably securing said spear means to said body,
   said biasing means has a gap therein and is rotatable about said body for removal and replacement of said spear means through said gap.

* * * * *